United States Patent [19]
Uhrin et al.

[11] Patent Number: 5,491,902
[45] Date of Patent: Feb. 20, 1996

[54] APPARATUS FOR MATCHING WALL COVERINGS

[76] Inventors: Thomas M. Uhrin; Theresa A. Uhrin, both of R.D. #1, Box 251-B, Latrobe, Pa. 15650

[21] Appl. No.: 294,338

[22] Filed: Aug. 23, 1994

[51] Int. Cl.$^6$ ................................... G01B 3/14
[52] U.S. Cl. .................. 33/563; 33/528; 33/DIG. 10
[58] Field of Search ..................... 33/563, 565, 566, 33/562, 528, DIG. 10; 220/241; 174/66; D10/64

[56] References Cited

U.S. PATENT DOCUMENTS

| | | | |
|---|---|---|---|
| 2,788,151 | 4/1957 | Shore | 33/562 |
| 4,345,381 | 8/1982 | Brislin | 33/528 |
| 4,353,759 | 10/1982 | Stallings | 33/563 |
| 4,802,284 | 2/1989 | Jackson | 33/DIG. 10 |
| 4,945,642 | 8/1990 | Saulietis | 33/562 |
| 5,129,297 | 7/1992 | Bussi | 33/528 |
| 5,321,206 | 6/1994 | Hibler | 33/562 |

Primary Examiner—Christopher W. Fulton

[57] ABSTRACT

The invention presented herein is an apparatus for matching wall coverings on a cover plate to a wall, ceiling or other background comprising a transparent or semi-transparent template which is sized to the cover plate and marked by tracing the design from the background. The process comprises placing the template over the electrical box in the wall, tracing the design thereto, placing the template over the match piece corresponding the design from the wall to align with the traced design, cutting the match piece at a perimeter and access opening or openings and adhesively fastening the sized match piece to the cover plate.

7 Claims, 6 Drawing Sheets

APPARATUS FOR MATCHING WALL COVERINGS

BACKGROUND OF THE INVENTION

1. Field of the Invention

This invention relates generally to an apparatus and process for matching wall coverings on a cover plate, switch plate, outlet plate, panel door, medicine cabinet door or the like to a wall, ceiling or other background.

2. Description of the Prior Art

One of the more tedious and difficult tasks constantly faced by professional and do-it-yourself wall covering hangers is to match pieces to be applied to cover and switch plates, panel doors and the like with a pattern or design on the wall, ceiling or background. The oldest method of matching such wall coverings is a trial and error process of laying a piece of wallpaper (that matches the pattern surrounding the outlet) on the outlet and moving the piece so that the patterns match as closely as possible. Then, the match piece placed on the outlet is withdrawn from the wall simultaneously with effort and care exerted not to disturb the location of the wallpaper match piece on the outlet plate. This process is undesirable, because there is considerable margin for error and guesswork.

Previous efforts to solve the outlined problem include a marking template, Wortham U.S. Pat. No. 4,259,785 involving a means of marking a wall covering by use of a template having a base plate, with two tabs thereon for receiving the outlet trim plate support screws and a plurality of pins extending from the template. The plurality of pins are used to make markings for cutting the match piece. Another apparatus and process is found at Stallings U.S. Pat. No. 4,353,759 consisting of a laminate template having an upper layer which lays over a contacted adhesive layer including a lower and lighter weight release paper forming the lower layer of the sandwich. This process involves covering the cover plate with a match piece and applying the scored template adhesively to the back of the match piece, trimming the match piece and scoring the same as per the template and pressing the cover plate against the adhesive using the marked positions; then, the match piece is applied to the cover plate.

Those paper covering hangers who wish to remain competitive in the business seek the most efficient and accurate methods of completing a job, which are evidenced in the applicant's patent application.

SUMMARY OF THE INVENTION

It is, therefore, an objective of the present invention to provide an apparatus for matching wall coverings on a cover plate to a wall, ceiling or other background which will match the patterns perfectly without guesswork.

It is the further object of this invention to provide an apparatus for matching wall coverings on a cover plate to wall, ceiling or other backgrounds which can be done expeditiously and without a high degree of training or skill.

It is the further object of this invention to provide an apparatus for matching wall coverings on a cover plate to a wall, ceiling or other background which is versatile and can be used for electrical switches, outlets, dimmer switches, cable plates, phone jack plates, electrical panels and the like.

It is the further object of this invention to provide an apparatus for matching wall coverings on a wall cover plate to a wall, ceiling or other background which is cost efficient to manufacture and sell.

It is the further object of this invention to provide an apparatus for matching wall coverings on a cover plate to a wall, ceiling or other background which is erasable and reusable. More specifically, the present invention is an apparatus for matching wall coverings on a cover plate to a wall, ceiling or other background, comprising a transparent template having scored markings for matching to a perimeter and shape of a cover plate by placement of said transparent template over an electrical box of corresponding perimeter and shape to said cover plate for tracing to said transparent template by use of a writing instrument a design located on said wall, ceiling or other background, creating a traced design marking on said transparent template.

These objects, as well as other objects and advantages of the present invention, will become apparent from the following description, in reference to the illustrations appended hereto.

BRIEF DESCRIPTION OF THE DRAWINGS

For a better understanding of the invention, reference may be had to the accompanying drawings, in which.

DESCRIPTION OF PREFERRED EMBODIMENTS

Figure 1:
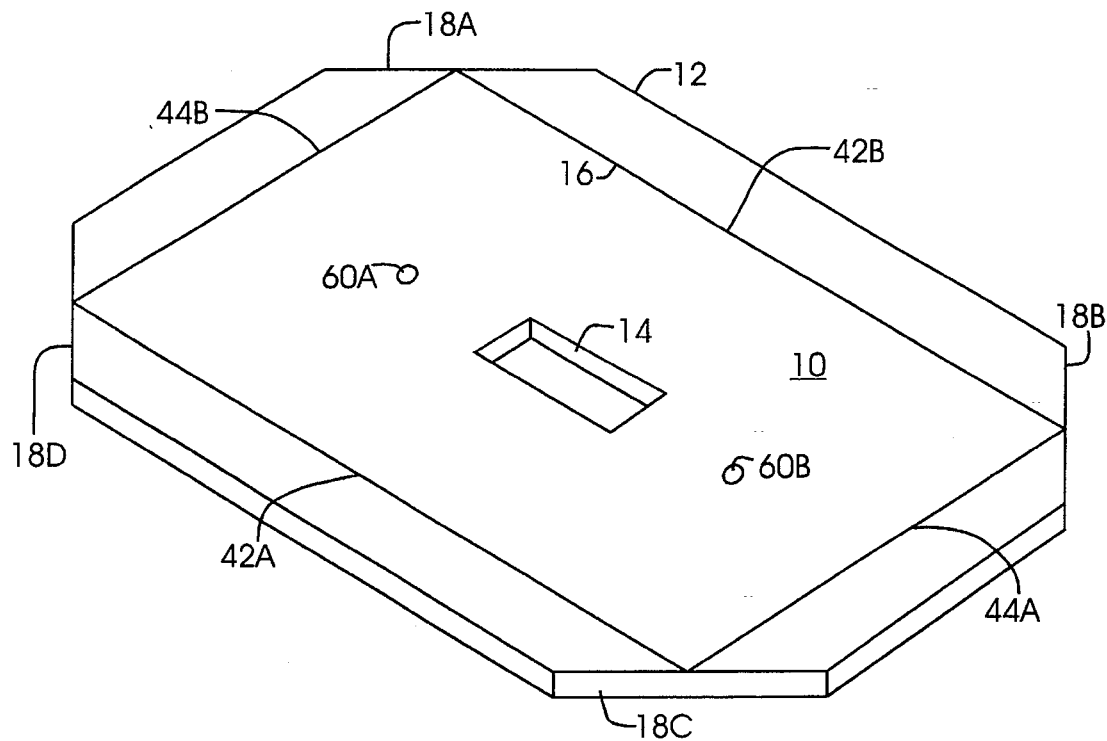
FIG. 1 is a perspective view of a switch cover plate for matching wall coverings on a cover plate to a wall, ceiling or other background.
Figure 2:
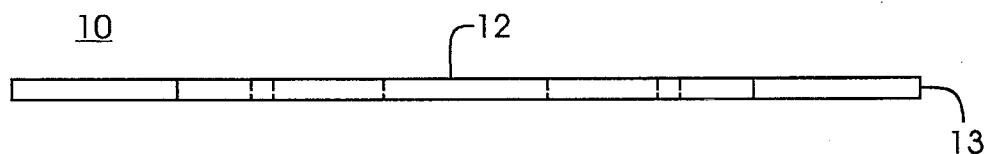
FIG. 2 represents a side elevation view of a switch cover plate as shown in FIG. 1.

Referring to the drawings, an apparatus for matching wall coverings 10 is shown in FIG. 1 and FIG. 2 comprising a transparent template 12 having template thickness 13. Transparent template 12 is generally constructed from a vinyl plastic or paper material and may be made from a semi-transparent or transparent material although for sake of brevity herein will be referred to as transparent. The transparent template 12 is scored with cover plate scoring 16 corresponding in size and shape to a cover plate 40 for purposes of aligning transparent template 12 to a switch lever electrical box 22 located in a wall cavity on a wall 25, whereby said switch lever electrical box 22 corresponds in shape to cover plate 40. Diagonal corner cuts 18A, 18B, 18C, and 18D are seen at each corner of transparent template 12, which when viewed with cover plate scoring 16 form marginal bevelled salvedge areas 34A, 34B, 34C, and 34D.

Figure 4:
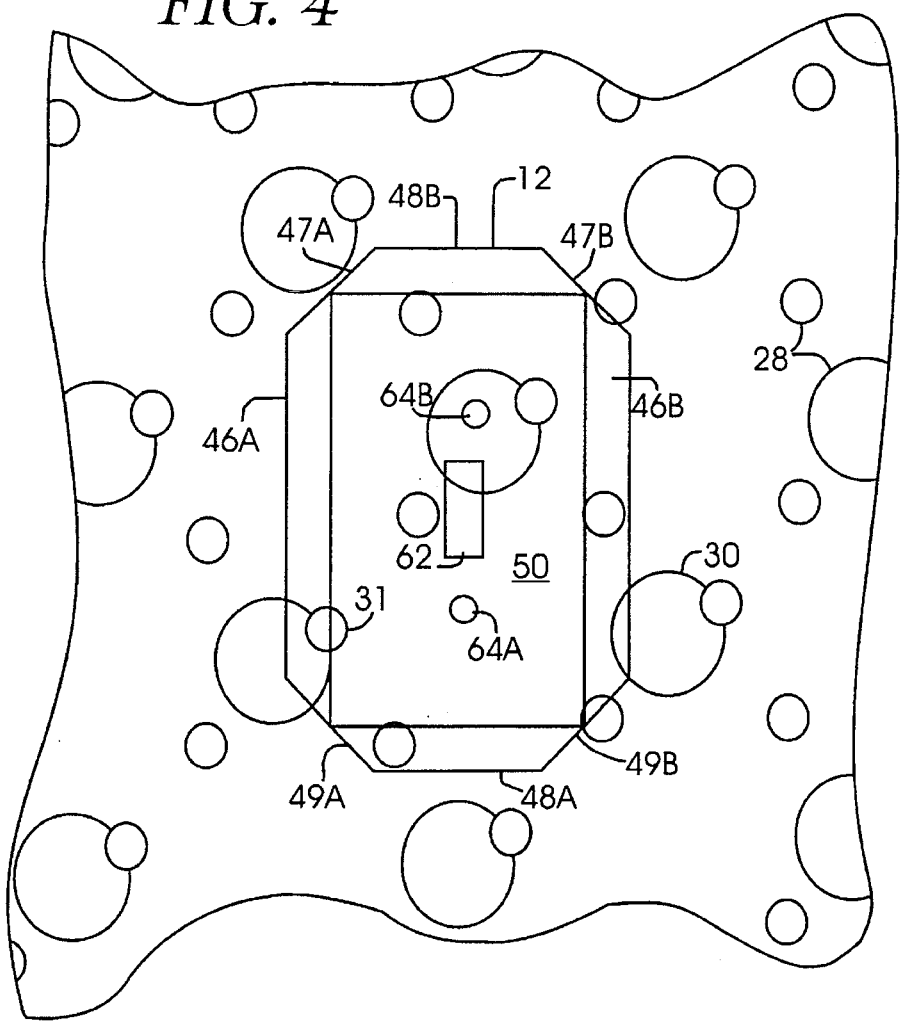
FIG. 4 is a top view of a match piece with a pattern or design being readied for application to a cover plate.
Figure 5:
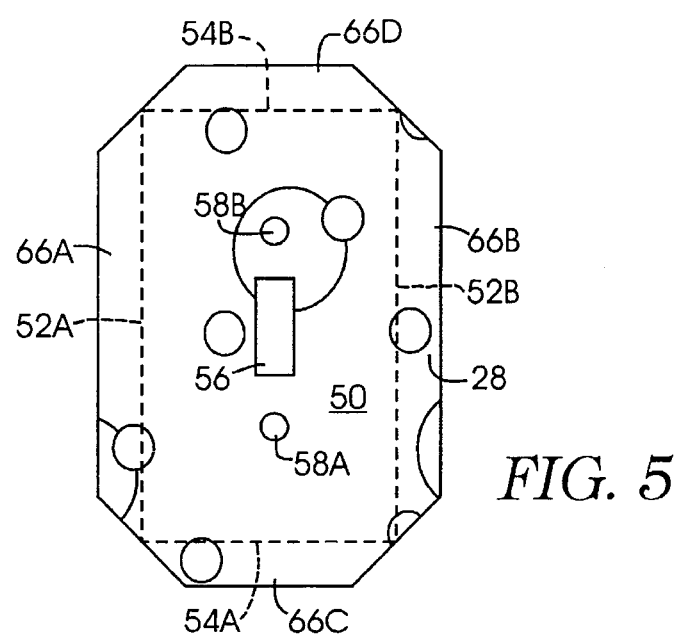
FIG. 5 is a match piece after cutting in ready form for application to a cover plate having been sized to said cover plate and having excess salvedge areas for concealment under said cover plate.
Figure 6:
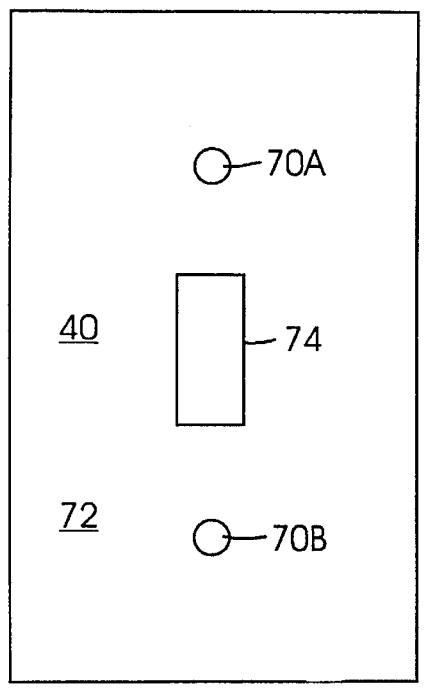
FIG. 6 is a top view of a switch cover plate.
Figure 7:
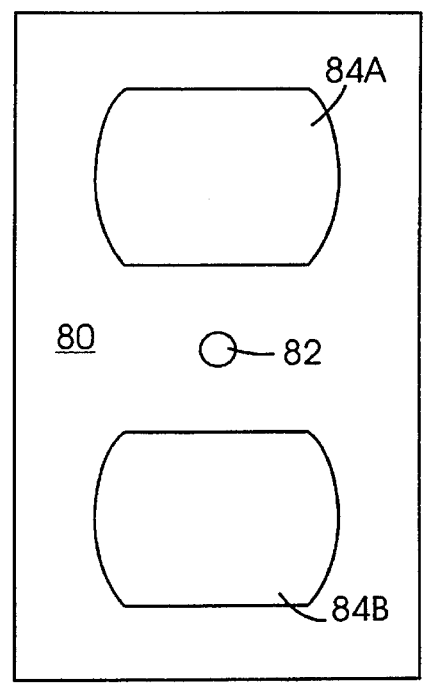
FIG. 7 is a top view of an outlet cover plate.
Figure 8:
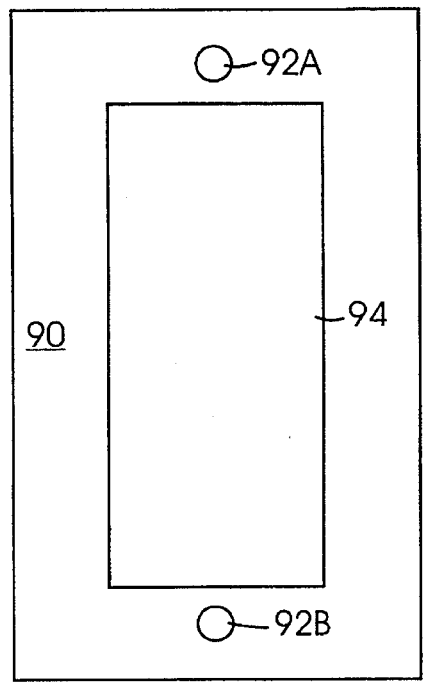
FIG. 8 is a top view of a dimmer switch cover plate.
Figure 9:
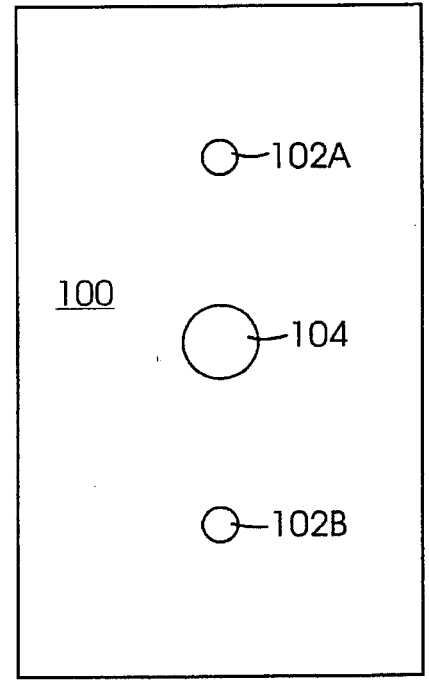
FIG. 9 is a top view of a cable outlet cover plate.
Figure 10:
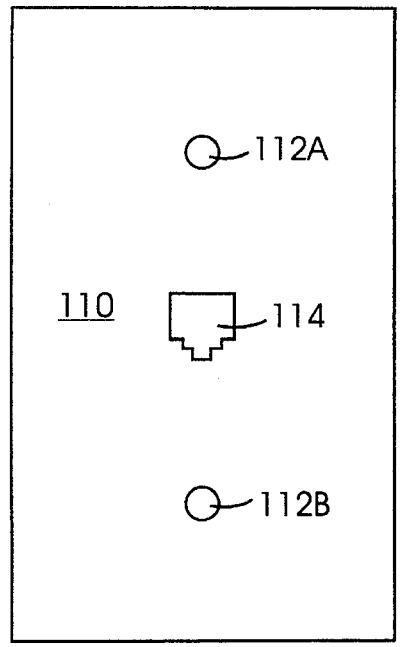
FIG. 10 is a top view of a telephone jack cover plate.
Figure 11:
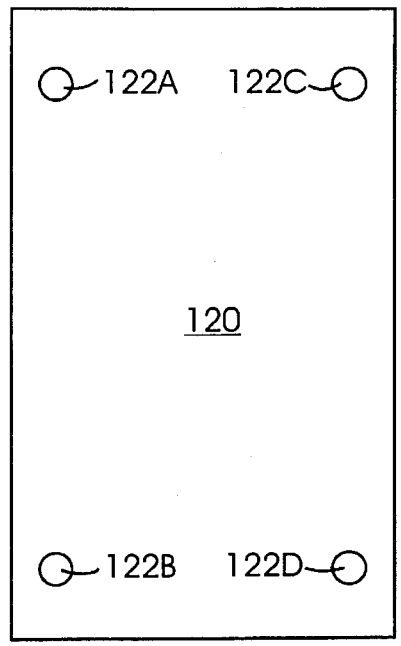
FIG. 11 is a top view of a flush opening plate.
Figure 12:
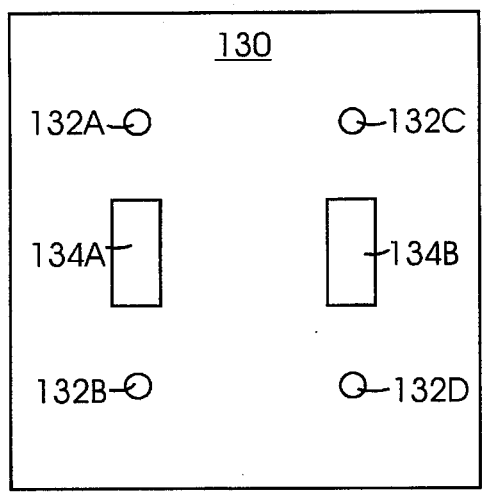
FIG. 12 is a top view of a multiple switch cover plate.
Figure 13:
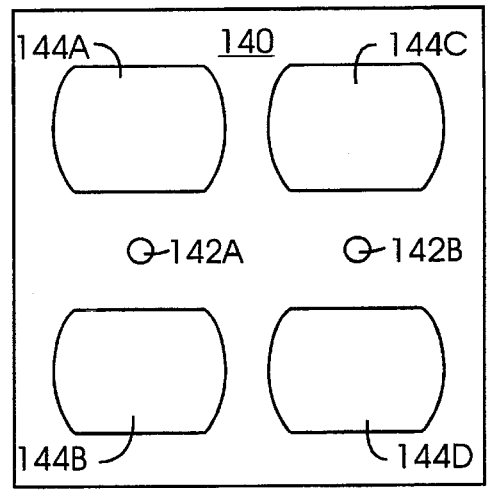
FIG. 13 is a top view of a multiple outlet cover plate.
Figure 14:
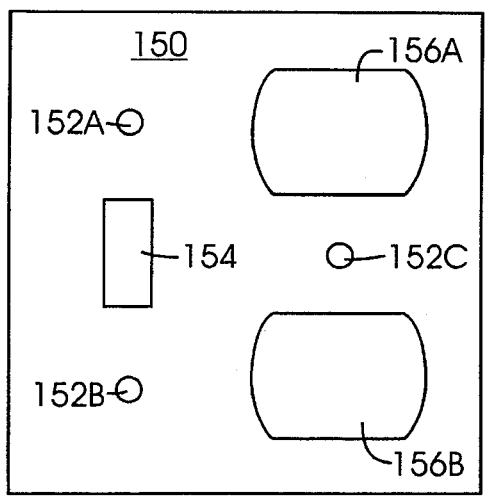
FIG. 14 is a top view of a combination switch/outlet cover plate.
Figure 15:
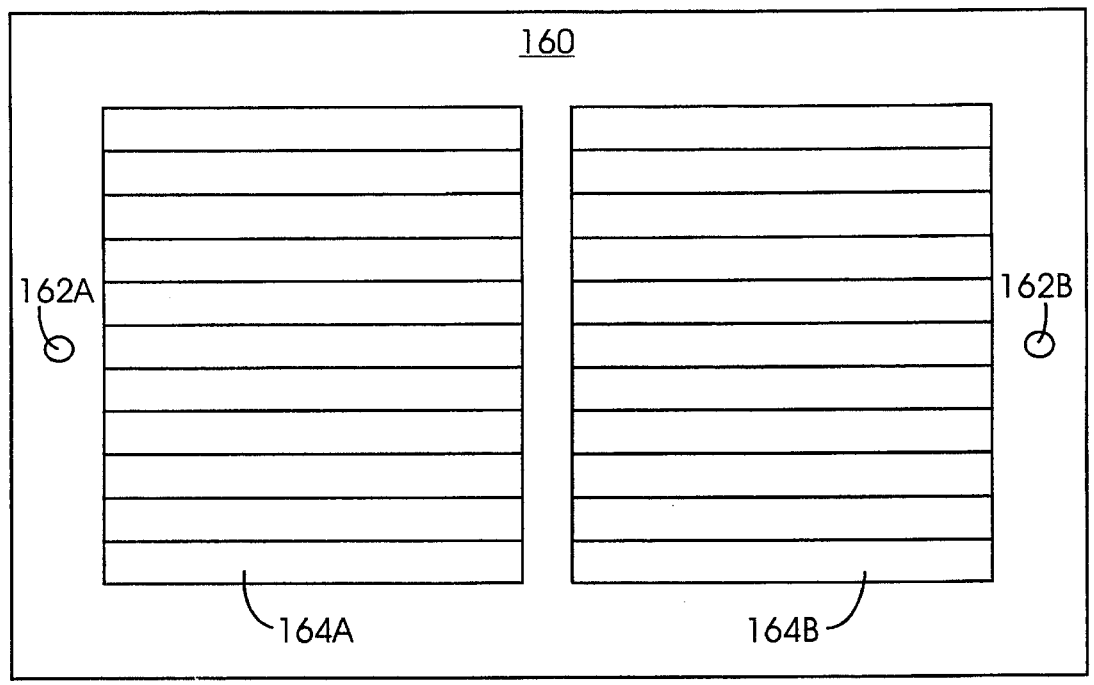
FIG. 15 is a top view of a multiple register cover plate.

Transparent template 12 is designed with switch access opening 14 and fastening screw openings 60A and 60B to enable wallpaper hanger 38 by use of drawing instrument 32 to mark match piece 50 as indicated in FIG. 4 and FIG. 5 with match piece switch access opening markings 56 and match piece fastening access opening markings 58B and 58B.

Figure 3:
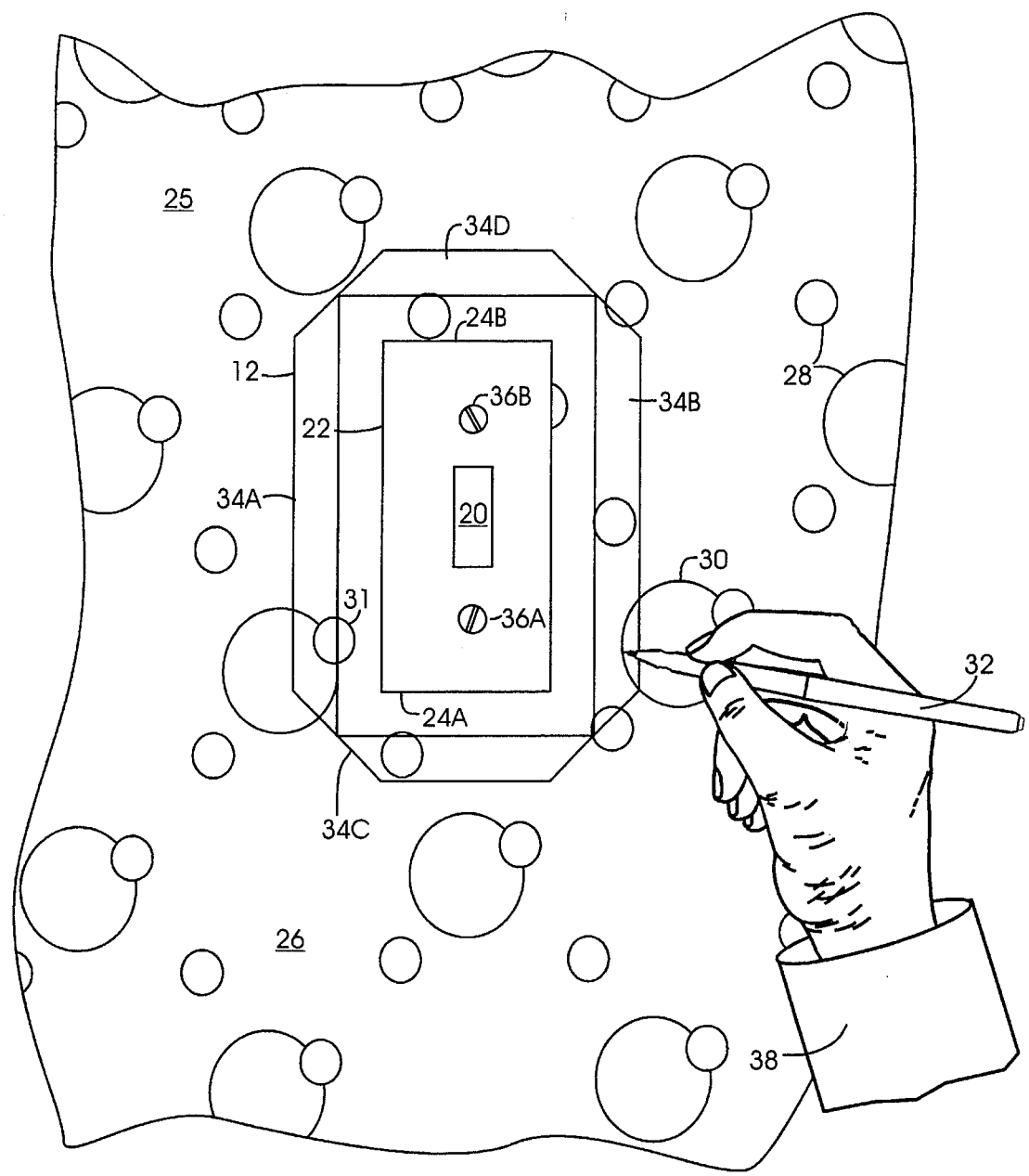
FIG. 3 is a top view of a transparent template which has been placed over an electrical box in a wall cavity for tracing a wall covering pattern from a wall to said transparent template.

The process begins by placing transparent template 12 over switch lever electrical box 22 as shown in FIG. 3. Alignment of the rectangular perimeter of switch lever electrical box 22 is done with the assistance of longitudinal scoring markings 42A and 42B and latitudinal scoring markings 44A and 44B. It is noted that switch lever electrical box 22 generally consists of switch lever wall mount brackets 24A and 24B located within wall 25. Fastening screws 36A and 36B pass through cover plate 40 at fastening screw openings 70A and 70B for mounting cover plate 40 to switch lever wall mount brackets 24A and 24B, respectively. Patterned wall covering 26 located in wall 25 represents the background for matching accurately a match piece 50 to cover plate 40, so as to achieve a congruent and aesthetically pleasing effect.

After aligning transparent template 12 to switch lever electrical box 22 as shown in FIG. 3, writing instrument 32 is applied to trace design 28 at design perimeter 30 onto transparent template 12 creating traced design markings 31. Transparent template 12 is placed over a match piece 50 of patterned wall covering 26 matching design 28 to traced design marking 31 as shown in FIG. 4. Writing instrument 32 is then used to trace the perimeter of transparent template 12 onto match piece 50 creating longitudinal match piece markings 46A and 46B and upper diagonal match piece markings 47A and 47B. Likewise, latitudinal match piece markings 48A and 48B and lower diagonal match piece markings 49A and 49B are marked onto match piece 50 as shown in FIG. 4. Access opening 14 and fastening screw openings 60A and 60B in transparent template 12 are used to mark match piece 50 with corresponding markings being switch access perimeter marking 62 and fastening screw markings 64A and 64B.

A cutting instrument (not shown) is used to cut match piece 50 from its larger form to a sized form appropriate for application to cover plate 40 by cutting along longitudinal match piece markings 46A and 46B, upper diagonal match piece markings 47A and 47B, latitudinal match piece markings 48A and 48B and lower diagonal match piece markings 49A and 49B creating an octagon as shown in FIG. 5. Likewise, switch access perimeter marking 62 is cut at its perimeter and fastening screw marking 64A and fastening screw marking 64B are cut in circular shape suitable for fastening screws 36A and 36B to pass through same. Match piece 50 is now produced in final form for application to cover plate 40 as shown in FIG. 5, having longitudinal fold lines 52A and 52B and latitudinal fold lines 54A and 54B.

Match piece 50 as shown in FIG. 5 is adhesively applied to a front side 72 of cover plate 40 by folding match piece 50 at longitudinal fold lines 52A and 52B and latitudinal fold lines 54A and 54B. Thus, match piece marginal bevelled salvedge areas 66A, 66B, 66C, and 66D are created and folded to an under side of cover plate 40 allowing switch lever 20 to protrude through match piece switch access opening marking 56 and cover plate switch opening 74 and creating a perfect match of design 28 on match piece 50 to patterned wall covering 26 after cover plate 40 is secured to switch lever box 22.

Traced design markings 31 may be removed from transparent template 12 by use of a wet sponge, towel, cloth or other material after the process is completed to make transparent template 12 reusable.

The above specification has been directed to a cover plate 40 designed to accommodate a switch lever 20. The same apparatus for matching wall covering 10 may be designed to apply to outlets, dimmer switches, cable outlets, telephone jack outlets, cabinet panels and a multitude of other wall plates and panels by changing the size and shape of the access openings and in the case of panel doors, changing the size of the apparatus for matching wall covering 10 to accommodate said panels.

The outlined process is applicable specifically to outlet cover plates 80 having outlet fastening opening 82 and outlet cover plate openings 84A and 84B, dimmer switch cover plate 90 having dimmer switch fastening openings 92A and 92B and dimmer switch plate opening 94, cable outlet cover plate 100 having cable fastening openings 102A and 102B and cable outlet plate opening 104, telephone jack cover plate 110 having telephone jack fastening openings 112A and 112B and telephone jack plate opening 114, flush opening plate 120 having flush opening plate fastening openings 122A, 122B, 122C and 122D, multiple switch cover plate 130 having multiple switch cover plate fastening openings 132A, 132B, 132C and 132D, and multiple switch cover plate openings 134A and 134B, multiple outlet cover plate 140 having multiple output cover plate fastening openings 142A and 142B and multiple output cover plate openings 144A, 144B, 144C and 144D, combination switch/outlet cover plate 150 having combination switch/outlet cover plate fastening openings 152A, 152B and 152C and combination switch/outlet cover plate openings 154 and 156A and 156B and register cover plate 160 having register cover plate fastening openings 162A and 162B and register cover plate openings 164A and 164B.

In accordance with the provisions of the Patent Statutes, we have explained the principle and operation of our invention and have illustrated and described what we consider to represent the best embodiment thereof.

We claim:

1. An apparatus for matching wall coverings on a cover plate to a wall, ceiling or other background, comprising:

A transparent template having scored markings for matching to a perimeter and shape of a cover plate by placement of said transparent template over an electrical box of corresponding perimeter and shape to said cover plate said transparent template having a reusable, traceable top surface using a writing instrument to copy a design located on said wall, ceiling or other background, creating a traced design marking on said transparent template.

2. An apparatus for matching wall coverings according to claim 1, wherein said transparent template has a thickness and diagonally cut corners forming a template salvedge to the outside perimeter of said score markings, for alignment to a matchpiece by placement of said transparent template over said match piece, matching said design to said traced design markings on said transparent template, in preparation for cutting said match piece to a shape corresponding to said transparent template.

3. An apparatus for matching wall coverings according to claim 2, wherein said template salvedge comprises a left longitudinal trapezoidal area, a right longitudinal trapezoidal area, a top latitudinal trapezoidal area and a bottom latitudinal trapezoidal area enabling said template salvedge to be aligned to said match piece creating a corresponding right match piece longitudinal trapezoidal area, left match piece longitudinal trapezoidal area, top match piece latitudinal trapezoidal area and bottom match piece latitudinal trapezoidal area creating collectively match piece salvedge for folding under said cover plate and simultaneously adhesively applying said match piece to said cover plate.

4. A process for matching wall coverings on a cover plate to a wall, ceiling or other background, comprising the steps of:

Placing a transparent template having scored markings corresponding to a perimeter and shape of an electrical box, over said electrical box;

Tracing onto said transparent template by use of a writing instrument a design located on said wall, ceiling or other background, creating traced design markings on said transparent template;

Placing said transparent template over a match piece of said wall, ceiling or other background, matching said design on said match piece to said traced design markings and marking said match piece with a writing instrument by tracing around a perimeter of said transparent template forming match piece perimeter markings on said match piece;

Marking said match piece by tracing with said writing instrument at an access opening and a multitude of fastening openings of said transparent template forming match piece access opening marking and a multitude of match piece fastening opening markings on said match piece;

Cutting with a cutting instrument at said match piece perimeter markings, at said match piece access opening marking and at said multitude of match piece fastening markings creating said match piece in a match piece form for application to said cover plate;

Adhesively fastening said match piece form to a front side of said cover plate.

5. A process for matching wall coverings on a cover plate to a wall, ceiling or other background in accordance with claim 4, comprising the further steps of:

Producing said match piece form by cutting same in the general shape of a rectangle and cutting each of four (4) corners creating four (4) angled corner lines and by bisecting each of said corner lines creating four (4) midpoints and drawing a line from a first of said midpoints to a second of said midpoints and from a second of said midpoints to a third of said midpoints and from said third of said midpoints to a fourth of said midpoints producing a rectangular area and a left longitudinal trapezoidal salvedge section, a right longitudinal trapezoidal salvedge section, a top latitudinal trapezoidal salvedge section and a bottom latitudinal trapezoidal salvedge section collectively creating match piece trapezoidal section for folding under the backside of said cover plate simultaneous to adhesively fastening said match piece to said cover plate such that said rectangular area is sized to said cover plate.

6. A process for matching wall coverings on a cover plate to a wall, ceiling or other background, in accordance with claim 5 comprising the further step of cleaning all markings from said transparent template making said transparent template readily reusable.

7. An apparatus for matching wall coverings on a cover plate to a wall, ceiling or other background, comprising:

a transparent template that could be of various forms having scored markings for matching to a perimeter and shape of a corresponding cover plate by placement of a single transparent template over a single electrical box of corresponding perimeter and shape to a single cover plate said single transparent template having a reusable, traceable top surface using a writing instrument to copy a design located on said wall, ceiling or other background, creating a traced design marking on said single transparent template; wherein said transparent template has a thickness and diagonally cut corners forming a template salvage to the outside perimeter of said scored markings, for alignment to a matchpiece by placement of said single transparent template over said matchpiece, matching said design to said traced design markings on said single transparent template, in preparation for cutting said match piece to a shape corresponding to said single transparent template; wherein said transparent template further comprises an access opening for an electrical switch, an access opening for an electrical outlet, an access opening for a dimmer switch, an access opening for a cable outlet, an access opening for a telephone jack, a flush plate, an access opening for multiple switches, an access opening for multiple outlets, an access opening for combination switch/outlets or an access opening for registers enabling access openings to be marked by said writing instrument on said matchpiece in preparation for further cutting said match piece to correspond to said access openings.

\* \* \* \* \*